Feb. 4, 1930.  C. KINZEL  1,746,042
AIRPLANE
Filed Aug. 15, 1928   2 Sheets-Sheet 1
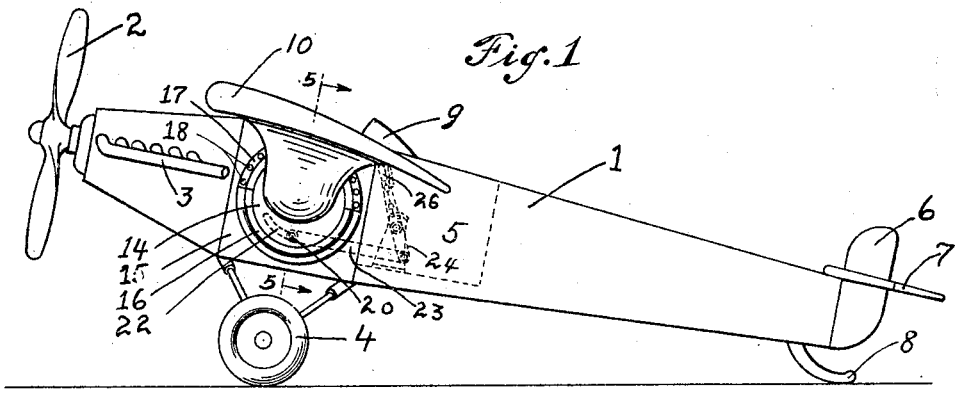
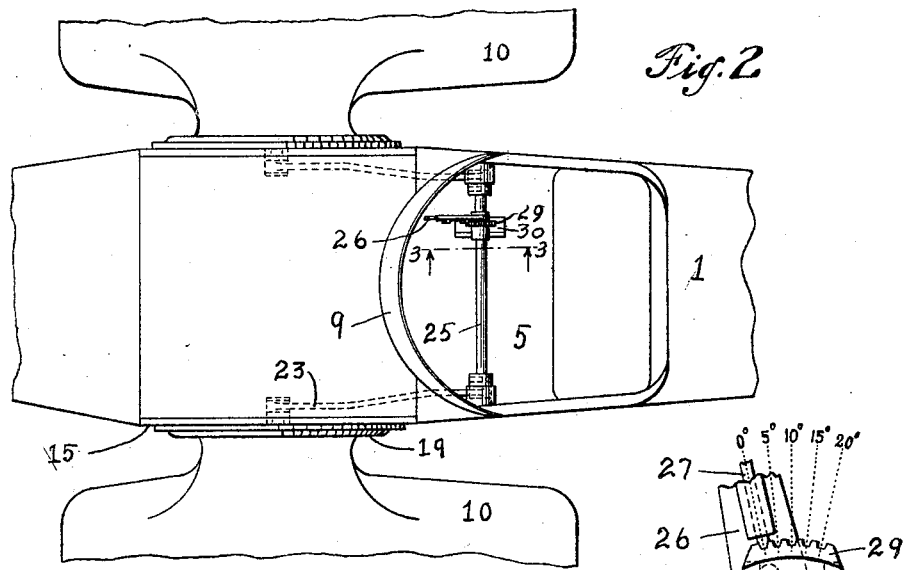
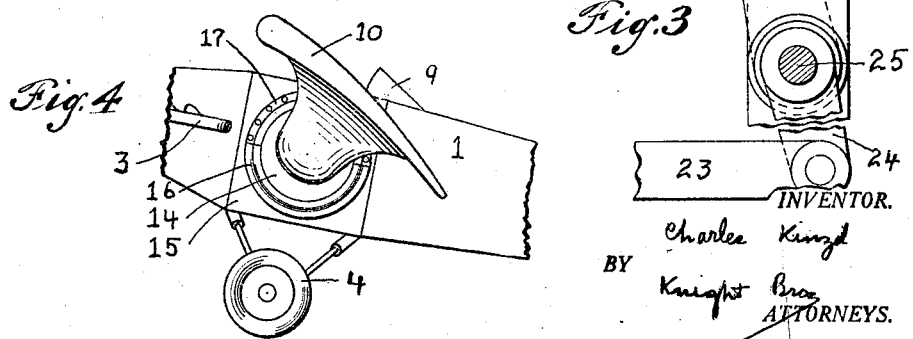
INVENTOR.
Charles Kinzel
BY Knight Bro
ATTORNEYS.

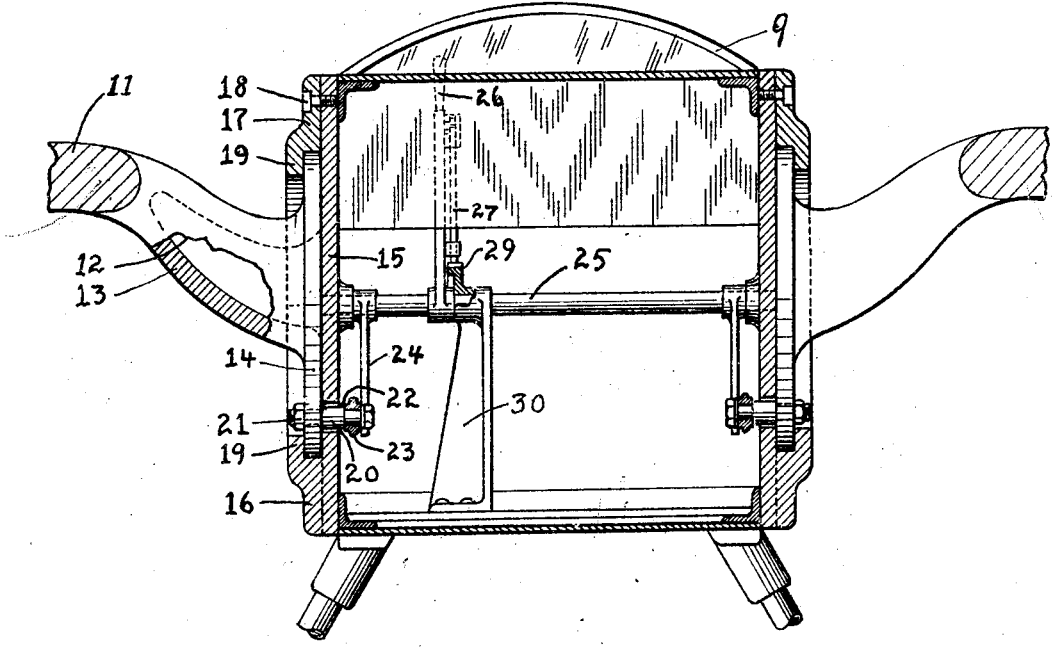
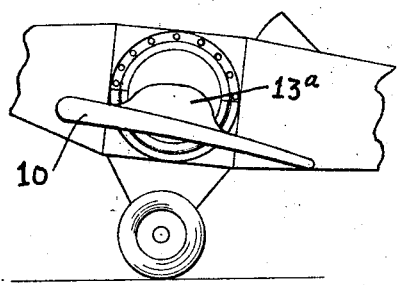
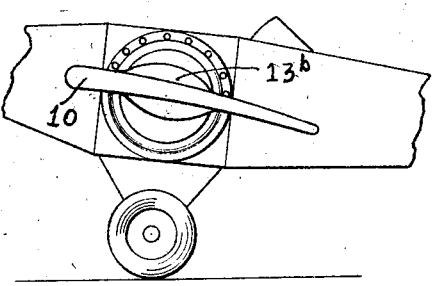
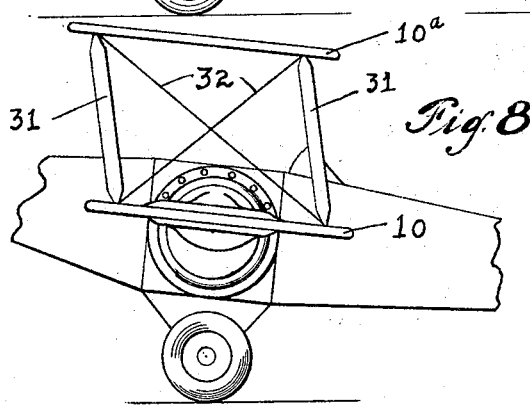

Patented Feb. 4, 1930

1,746,042

UNITED STATES PATENT OFFICE

CHARLES KINZEL, OF NUTLEY, NEW JERSEY

AIRPLANE

Application filed August 15, 1928. Serial No. 299,850.

This invention relates to airplanes in which the sustaining wings are mounted so that they may be tilted on their major axes during flight or when taking off or landing.

The advantages of tiltable wings are recognized in the art. By varying the angle of incidence with reference to the speed of the plane at a given instant, and with reference to whether the plane is ascending, descending, or flying on a level, flying efficiency and safety may be materially increased and when running upon the ground, the wings may be used as a brake.

It is, of course, essential that the sustaining wings of an airplane be strongly braced against the heavy transverse stresses imposed upon them during flight. This is comparatively a simple problem in the conventional type of airplane in which the wings are immovably mounted and can, therefore, be braced at any desired points and securely attached to the fuselage in a rigid unitary structure. The problem of attaching the wings to the fuselage becomes more difficult when the wings are to be left free to tilt upon their major axes, and it is the primary object of my invention to provide a pivotal mounting for the wings which will give adequate rigidity and resistance to stresses transverse to the axis of rotation.

It is a further object of my invention to provide means within the fuselage whereby the wings may be tilted by the operator at will and securely locked in any selected position.

With these objects in view, the invention consists mainly in a mounting by means of which the wings are pivotally attached to the fuselage, the mounting consisting of bearing members which are radially expanded to increase the moment of resistance to stresses imposed upon the wings transverse to the axis of rotation. Other features of the invention will be pointed out in the following detailed description of several illustrative embodiments of the invention.

In the drawings—
Figure 1 is a side elevation of an airplane equipped with tiltable wings according to the present invention;

Figure 2 is a partial view of the same in plan;
Figure 3 is a vertical section on the line 3—3 of Figure 2 showing details of the wing tilting mechanism;
Figure 4 is a fragmentary side elevation showing a position of the wings different from that shown in Figure 1;
Figure 5 is a vertical transverse section on the line 5—5 of Figure 1;
Figures 6, 7 and 8 are fragmentary side elevations showing my improved wing mounting as adapted to wings of different types and variously located with reference to the fuselage.

In Figures 1 to 5 a monoplane is illustrated, 1 designating the fuselage; 2 the propeller; 3 the engine; 4 the landing gear; 5 the operator's compartment or cockpit; 6 and 7 the vertical and horizontal rudders; 8 the tail skid, and 9 the wind shield. These parts may be of any conventional or suitable form and need not be considered in detail. To avoid complicating the drawings the customary control levers, instruments, etc., are omitted.

The wings 10 on either side of the fuselage may be of any usual construction in their main sustaining portions; for example, they may be composed of a metal or wooden frame 11, covered with the usual wing fabric 12 (see Figure 5). At their inner ends the wings terminate in brackets 13 which are preferably of skeleton form and integral with or at least rigidly united with the frames of the wings. The brackets are preferably covered by the same fabric which covers the wings. Integral with the brackets 13 are circular bearing plates or flanges 14 which are substantially expanded or radially enlarged in planes perpendicular to the major axes of the wings, i. e. perpendicular to the axis of rotation. The inner plane faces of the flanges 14 are adapted to lie against side walls 15 of the fuselage, being rotatably held in this position by retaining rings which are formed on or secured to the fuselage. As shown, these retaining rings are composed of lower segments 16 integral with or permanently united with the side walls of the fuselage and upper segments 17, which are detachably secured to the fuselage by means of bolts 18. The retaining rings have an inwardly presented overhanging lip 16 which snugly engages the flanges 14, permitting rotation of the flanges, but holding them closely against the side walls of the fuselage. The application of the retaining lips 16 to the peripheries of the radially expanded flanges 14 gives a very favorable moment of resistance to the stresses imposed upon the wings. This constitutes an important feature of my invention since it is necessary to dispense with the usual braces running to the outer ends of the wings in order to leave the wings free to rotate. The segments are semicircular as shown, but it will be understood that the upper and lower segments need not be of the same dimensions, provided the upper segments are not less than 180°. The segmental construction of the retaining rings facilitates assembling the wings on the fuselage.

The means for rotating the wings will now be described. Shouldered pins 20 project inwardly from the flange 14 and are firmly secured thereto by nuts 21 on the outer threaded ends of said pins. The pins project through the side walls 15 of the fuselage through the arcuate slots 22, and are connected to means within the fuselage for reciprocating the pins in the slots, whereby the wings may be rotated to vary their angle of incidence within the limits imposed by the length of the slots 22. Any desired range of tilting may be provided for, but for practical purposes it will probably be sufficient to provide for adjustments of the plane of the wings from zero degrees to 20 degrees with respect to horizontal. The maximum inclination of the wings for the example given is shown in Figure 4, this position being mainly useful in offering a braking resistance to forward travel when the airplane is running on the ground.

The means for reciprocating the pins 20 in the slots 22 comprise, in the example shown, links 23 pivotally secured at their forward ends to the pins 20, and at their rear ends to rocker arms 24, keyed to shaft 25 which is journalled in the side walls 15 of the fuselage. An operating lever 26 is also keyed to the shaft 25 and disposed in a position within convenient reach of the operator. For locking the wing adjusting parts in any selected position there is provided a spring controlled latch 27 mounted upon the lever 26. The latch 27 is manipulated by a finger lever 28 and at the lower end of the latch there is provided a curved rack 29 with a series of notches corresponding to the desired number of angular adjustments of the wings. The rack 29 is supported upon a standard 30 which is bolted to the floor of the fuselage.

The operation of the device will be readily understood. By depressing the finger lever 28 the operator may withdraw the latch 27 from engagement with the rack 29. He may then rock the lever 26 and this movement will be transmitted through shaft 25 and links 24 to the pins 20, which will travel in the slots 22 imparting a turning movement to the flanges 14 and wings 10. Having selected the wing position which he deems suitable, the operator will lock the parts in the adjusted position by releasing the finger lever 28.

In Figure 6 a monoplane is shown in which the wings 10 are positioned below the axis of rotation. This calls merely for modification of the shape of the brackets 13$^a$, and does not necessitate any change in the bearing flanges retaining rings or the wing rotating mechanism. This is true also of the modification shown in Figure 7, in which the wings are disposed substantially in the plane of the axis of rotation. In Figure 8 the application of my invention to a bi-plane is illustrated. In this construction the upper planes 10$^a$ are rigidly supported on the lower planes 10 by means of struts 31 and braces 32. The lower planes are rotatably secured to the fuselage in the manner hereinbefore described and the upper planes will partake of any adjustment which may be given to the lower planes.

I claim:—

1. In an airplane with wings tiltable on their major axes, the combination of a fuselage, a wing having a frame which flares at its inner end and merges into a radially expanded bearing member, means carried by the fuselage for rotatably engaging the bearing member, and means for tilting the wing.

2. In an airplane with wings tiltable on their major axes, the combination of a fuselage, a wing having a frame which flares at its inner end and merges into a radially expanded bearing flange, means carried by the fuselage for rotatably engaging the bearing flange, and means for tilting the wing.

3. In an airplane with wings tiltable on their major axes, the combination of a fuselage, a wing having a radially expanded bearing flange, retaining means carried by the fuselage for rotatably engaging the bearing flange at its periphery, and means for tilting the wing.

4. In an airplane with wings tiltable on their major axes, the combination of a fuselage, a wing having a radially expanded bearing flange abutting against a side wall of the fuselage, a retaining ring carried by the fuselage and having an overhanging lip engaging said flange, and means for tilting the wing.

5. In an airplane with wings tiltable on their major axes, the combination of a fuselage, a wing having a radially expanded bearing flange abutting against a side wall of the fuselage, a segmental retaining ring carried by the fuselage and having an overhanging lip engaging said flange, a segment of said wing constituting at least 180° being separably attached to the fuselage, and means for tilting the wing.

6. In an airplane with wings tiltable on their major axes, the combination of a fuselage, a wing having a radially expanded bearing flange abutting against a side wall of the fuselage, a retaining ring carried by the fuselage and having an overhanging lip engaging said flange, said ring comprising a lower segment permanently united with the fuselage, and an upper segment constituting not less than 180° of the ring separably attached to the fuselage, and means for tilting the wing.

7. In an airplane with wings tiltable on their major axes, the combination of a fuselage, a wing having a radially expanded bearing member abutting against a side wall of the fuselage, said side wall having a slot adjacent said bearing member, wing-rotating operating means within the fuselage, and means operatively connecting said operating means and bearing member through said slot.

8. In an airplane with wings tiltable on their major axes, the combination of a fuselage, a wing having a radially expanded bearing member abutting against a side wall of the fuselage, said side wall having a slot adjacent said bearing member, and a pin projecting from the bearing member through said slot into the interior of the fuselage whereby the wing may be rotated from within the fuselage.

9. In an airplane with wings tiltable on their major axes, the combination of a fuselage, a wing having a radially expanded bearing member abutting against a side wall of the fuselage, said side wall having a slot adjacent said bearing member, a pin projecting from the bearing member through said slot and into the interior of the fuselage, a rock shaft within the fuselage, a rocker arm carried by said shaft, a link connecting said rocker arm with said pin, and means for rocking said shaft.

CHARLES KINZEL.